United States Patent [19]

Curts et al.

[11] 4,011,387
[45] Mar. 8, 1977

[54] ADHESIVE RESINS AND METHOD OF PRODUCTION THEREOF

[75] Inventors: Julius Curts; Hanns Pietsch, both of Hamburg, Germany

[73] Assignee: Beiersdorf Aktiengesellschaft, Hamburg, Germany

[22] Filed: July 23, 1975

[21] Appl. No.: 598,533

[30] Foreign Application Priority Data

Aug. 8, 1974 Germany ............................ 2438125

[52] U.S. Cl. .................................. 526/281; 260/5; 260/666 A; 260/854; 260/874; 260/873; 260/896; 260/901; 428/355; 526/282; 526/308

[51] Int. Cl.$^2$ .......................................... C08F 32/06

[58] Field of Search ...... 450/744; 260/931, 88.2 D, 260/88.2 C, 87.5 C, 82.1, 666 A; 526/308, 281, 282

[56] References Cited

UNITED STATES PATENTS 3,846,352  11/1974  Bullard et al. ........................ 260/5

*Primary Examiner*—Stanford M. Levin
*Attorney, Agent, or Firm*—Bierman & Bierman

[57] ABSTRACT

An adhesive resin comprising the polymer of dimethyl-di-(cyclohexen-3)-yl-methane as well as a copolymer of this compound with at least one mono-or di- ethylenically unsaturated hydrocarbon or chlorinated hydrocarbon, said hydrocarbon having 4 to 12 carbon atoms. A method of making these resins and a method of causing adhesion using such resins are also disclosed, as well as compositions including this resin.

8 Claims, No Drawings

ADHESIVE RESINS AND METHOD OF PRODUCTION THEREOF

This application claims the benefit of the priority of German Application No. P 24 38 125.7, filed Aug. 8, 1974.

The invention concerns a method for the production of new adhesive resins as well as their use in pressure-sensitive adhesives. It also includes adhesive compositions incorporating such resins.

Adhesive resins are oligomers which yield in combination with other polymers, particularly elastomers, like rubber, polyolefins and polyacrylates or polyvinylacetales, polyamides and polyesters, compounds which remain sticky and adhere even on the application of slight pressure — such materials are called pressure sensitive adhesives — or compounds which harden from an initially adhesive phase to a final phase in which they are no longer adhesive.

Adhesive resins have as a rule a molecular weight of 800 to 2000 and are obtained primarily from natural products; for example rosin or beta-pinene. Such adhesive resins have been highly successful in the past and are therefore in great demand. However, the demand can no longer be satisfied from natural sources. Great efforts have therefore been made to expand the range of raw materials useful in the manufacture of these adhesive resins by, for example, using alpha-pinene—which is harder to polymerize than beta-pinene—for the production of the resin, or by trying to "dilute" the natural raw materials by admixtures with synthetics like styrene.

Furthermore there have been a number of suggestions for the production of completely synthetic adhesive resins from petroleum fractions in order to cover the increased demand. However, most resins based on petrochemical starting materials vary considerably in their chemical composition, since the composition of the cracked products is very sensitive to minor fluctuations in process control. Also, the products obtained must frequently be subjected to a cyclizing oligomerization, which in turn supplies a wide mixture of cyclic olefins. The production of these adhesive resins by synthetic means generally requires three reaction steps: cyclization, polymerization and hydrogenation.

A pressure-sensitive adhesive which is to be used for the production of adhesive tapes, labels etc. must have three main properties; namely, good instant tackiness, and sufficient adhesive and cohesive strength. The above resins based on beta-pinene and rosin have these properties to a very great extent in combination with the above-mentioned elastomers. While many of the petroleum-based adhesive resins developed so far effect satisfactory cohesive strength, but poorer instant tackiness and adhesion. With the exception of hydrogenated (and accordingly more expensive) resins, these petroleum based resins have found little use for the foregoing reasons as well as because of their unpleasant color tones.

In the production of self-adhesive compounds, the adhesive properties depend to a great extent on the mean molecular weight distribution and on the chemical structure of the resin. Higher molecular weights generally yield better cohesive properties.

An object of this invention is, therefore, to develop a method for the production of new adhesive resins (particularly for self-adhesive compounds) which leads to products which—starting substantially from synthetic raw materials—show the above-mentioned three important adhesive properties in a well balanced ratio, so that they equal or even exceed those of the beta-pinene resins. This means that these resins must effect good instant tackiness and adhesiveness with relatively high molecular weights and correspondingly good cohesion. In addition, the resins should be so thermo-stable that they undergo practically no weight losses or discoloration on heating, so that they can also be used in hot melt adhesives.

Another object of the invention is to arrive at the new products in a very simple manner; that is, in one process step.

This problem was solved by polymerizing the monomer dimethyl-di-(cyclohexene-3)-yl-methane alone or in mixture with mono- or di- ethylenically-unsaturated hydrocarbons or chlorinated hydrocarbons in the presence of Friedel-Crafts-catalysts. These hydrocarbons have 4 to 12 C-atoms and are present in molar ratio of up to 2 moles of hydrocarbon to one mole of monomer.

The dimethyl-di-(cyclohexen-3)-yl-methane of the present invention is characterized by the following formula

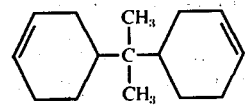

This compound demonstrates good polymerizability and yields adhesive resins which are capable of completely replacing the previously known terpene resins. The resins of the present invention can be modified by copolymerization with other monomers of both synthetic and natural origin. In this manner the final product can be adapted to specific requirements as needed.

Particularly suitable as comonomers are mono- or di- ethylenically-unsaturated hydrocarbons or chlorinated hydrocarbons. Such comonomers have 4 to 12 C-atoms and are preferably cyclic compounds. Typical of this group are alpha-pinene, beta-pinene, di-pentene, cyclo-pentadiene, vinylcyclohexene, cyclododecene and styrene. Butadiene can also be used as well as its derivatives isoprene and chloroprene.

It has been found that these modifying comonomers can be used up to a molar ratio of monomer to comonomer of up to 1 to 2 without impairing the advantageous properties of the monomer. In some instances, the comonomers actually improve the properties of the final resins.

The polymerization or copolymerization according to the invention can be carried out directly on the monomers, but preferably it is effected in the presence of solvents. Suitable solvents, which should be anhydrous as far as possible, are for example, aliphatic hydrocarbons, like hexane, heptane, and cyclohexane; aromatic hydrocarbons, such as benzene, toluene and xylene; or chlorine-containing aliphatics, like methylene chloride, 1,2-dichloroethane, chloroform and carbon tetrachloride.

As catalysts for the cationic polymerization reaction, the known Friedel-Crafts catalysts are used. They are based on metal halides like aluminum chloride, aluminum chloride complexes, aluminum bromide, boron trifluoride, zirconium tetrachloride, titanium tetrachloride, or mixtures thereof. Particularly suitable is aluminum chloride. The concentration of the catalysts can vary within relatively wide limits, but it is preferably 1 to 50 mole % based on the monomers and comonomers (if any) present. Below this concentration range, the reaction is too slow, above this range the reaction products are very dark, since undesired secondary reactions take place as found by the IR-spectra of such products.

The reaction is preferably carried out by adding the monomers (and comonomers) dropwise to the solvent which already contains the catalyst. Since the polymerization reaction generates heat, the reaction temperature must be regulated by the rate at which the drops are added, and, if necessary, by the additional cooling. The reaction temperature and time are not narrowly limited, however. The polymerization takes place satisfactorily at from about −10° to +60° C in 1 to 7 hours. Optimum reaction conditions exist when the principal reaction is carried out at from about −10° to +10° C and the completion of the reaction at about 60° C.

After the polymerization is completed, the mixture is first washed with dilute hydrochloric acid and then with water, and subsequently freed of the residual solvent and low-boiling substances by distillation under reduced pressure to obtain a resin of a light ivory color. By dissolving the resin again in toluene or benzene and precipitating it with methanol, a white powdered product is obtained.

The resins thus produced have a number average molecular weight of about 800 to 1200, a softening point of 70° − 150° C and a Gardner color number of 11−17 (corresponding to the Gardner color chart 1933—(ASTM D 154)—measured with the Lovibond comparator.)

The new resins are compatible with natural and synthetic rubbers and show the three adhesive properties in a well-balanced ratio so that they are particularly suitable for use in self-adhesive compounds. They exceed the commercially available petroleum-based adhesive resins in their instant tackiness, and the natural resins in their cohesive strength. Due to their good compatibility with these resins, they can also be blended with them to a great extent; that is, their properties can be modified. The resins according to the invention are also compatible with ethylene vinylacetate copolymers and polyamides and can therefore be used in such hot-melt adhesives.

The following examples will illustrate the invention further.

EXAMPLE 1

In a three-necked flask, which was equipped with a stirrer, a dropping funnel and a thermometer, 204 g (1 mole) of dimethyl-di-(cyclohexen-3)-yl-methane were introduced into a suspension of 13 g (0.1 mole) of finely-powdered anhydrous aluminum chloride in 200 ml toluene. The temperature of the solution was controlled between −10° and +10° C. The addition was completed after 2-3 hours. The temperature of the solution rose to room temperature. Subsequently to complete the reaction the mixture was further heated for 8 hours at 60° C. Then 400 ml of 10% hydrochloric acid were added and stirred for 1 hour. The hydrochloric acid was separated in a separating funnel, the solution of the resin twice washed with 3 percent hydrochloric acid and water, mixed with 40G calcium hydroxide and 40 g diatomaceous earth, stirred for 20 minutes at 60° C., and filtered. After distilling off the solvent and the residual monomer, the resin remained as a highly viscous light-yellow mass in the flask, which solidified after a few hours.

| | |
|---|---|
| Yield | 99% |
| color number (Gardner) in 50% toluene solution | 12 |
| softening point (ring-ball method) | 108° C |
| molecular weight (measured by steam pressure osmosis) | 1020 |

EXAMPLES 2 − 6

In the same manner as described in Example 1, the following homopolymers were produced, but the type and amount of catalyst, as well as the solvent, were varied.

| Example | Catalyst | Solvent | Reaction Temp. (° C.) | Completing Reaction | Yield | Softening Point | Color No. | Mol. Wt. |
|---|---|---|---|---|---|---|---|---|
| 2 | 0.1 mole $AlCl_3$ | 1,2-dichloroethane | 0−5 | 40° C/4 h | 58 | 107 | 12 | 924 |
| 3 | 0.1 mole $AlCl_3$ | carbon tetrachloride | −5 to +5 | 60° C/8 h | 74 | 151 | 11 | 1183 |
| 4 | 0.1 mole $AlBr_3$ | toluene | −5 to +5 | 60° C/4 h | 58 | 69 | 13 | 825 |
| 5 | 1 mole $AlCl_3$ | toluene | −5 to +5 | 60° C/4 h | 64 | 118 | 17 | 968 |
| 6 | 0.5 mole $AlCl_3$ | methylene Chloride | −5 to +5 | 40° C/4 h | 58 | 122 | 11 | 1094 |

EXAMPLE 7 − 15

These examples concern copolymers each consisting of 1 mole dimethyl-di-(cyclohexen-3)-yl-methane with the amount of copolymer indicated in the following table. The reactions were carried out as described in Example 1.

| Example | Comonomer | Solvent | Reaction Temp. (° C.) | Completing Reaction | Yield | softening Point (° C.) | Color No. | Mol. Wt. |
|---|---|---|---|---|---|---|---|---|
| 7 | 0.25 mole beta-pinene | toluene | 0 to 5 | 60° C/6h | 79% | 95 | 17 | 914 |
| 8 | 0.5 mole | ″ | −5 to 5 | 60° C/4h | 95% | 123 | 11 | 1036[1] |

-continued

| Example | Comonomer | Solvent | Reaction Temp. (° C.) | Completing Reaction | Yield | softening Point (° C.) | Color No. | Mol. Wt. |
|---|---|---|---|---|---|---|---|---|
| 9 | beta-pinene 1.0 mole | " | −5 to 10 | 60° C/4h | 98% | 126 | 13 | 1041 |
| 10 | isoprene 0.5 mole | " | −5 to 15 | 60° C/4h | 90% | 96 | 13 | 911 |
| 11 | dipentene 0.1 mole | " | −5 to 5 | 60° C/4h | 91% | 131 | 12 | 1089 |
| 12 | vinylcyclo-hexene 0.5 mole | " | −5 to 10 | 60° C/6h | 89% | 83 | 11 | 861 |
| 13 | cyclododecene 0.25 mole | " | −5 to 5 | 60° C/4h | 91% | 115 | 15 | 933 |
| 14 | styrene 0.5 mole | " | −10 to 0 | 60° C/4h | 89% | 160 | 12 | — |
| 15 | cyclo-pentadiene 0.5 mole isoprene | carbon tetra-chloride | −5 to 5 | 60° C/4h | 78% | 134 | 11 | 1120 |

EXAMPLES 16 – 23

These examples describe the properties of self-adhesive compounds which were produced from the resins described in the preceding examples.

For the production of the self-adhesive compounds, the resin and other components were kneaded in a kneader, using solvents, preferably gasoline (boiling point 60° – 95° C.) and toluene. The solution obtained was applied with a conventional coating device on a polyethylene glycol terephthalate film (thickness 25μ) and dried for five minutes at 70° C. All tests of the self-adhesive properties were made on a strip of 2 cm width of these self-adhesive films.

Test of Adhesive Power on Steel

Strips of 20 mm width of the test material were pasted on ground and degreased plates of stainless steel and rolled over back and forth 5 times with a weighted roller (2kg/cm band width, speed 10 m/min). the test strip was removed from the steel plate with a pull test machine and the measured force indicated in pond/cm (stripping angle: 180°, speed 30 cm/min).

Test of Holding Power

A strip of about 15 cm length and 20 mm width was so pasted on a ground and degreased plate of stainless steel that a length of 1 inch was covered. The strip was pressed on with a roller weighing 2 kg by rolling it slowly once back and forth, and the free end of the strip was then vertically loaded with a weight of 800 g. The test was carried out at the respective temperatures indicated in the table and the time until the strip fell off was indicated in minutes.

| Example | Formula | Coating weight (g/m²) | Adhesive Power (p./cm) | Hldg. Power (Rm. Temp.) (min.) | Hldg. Power 50° C (min.) | Hldg. Power 100° C (min.) |
|---|---|---|---|---|---|---|
| 16 | 80 g natural rubber[1] 80 g resin (of Ex. 1) 1 g sontal[2] | 21.6 | 280 | 745 | 29 | 7 |
| 17 | 80 g natural rubber 120 g resin (of Ex. 1) 1 g sontal | 22 | 450 | 2485 | 34 | 7 |
| 18 | 60 g Cariflex 1101[3] 90 g resin (of Ex. 1) 1 g sontal | 25.5 | 375 | >10000 | >10000 | 57 |
| 19 | 80 g natural rubber 80 g resin (of Ex. 8) 1 g sontal | 15.8 | 230 | >10000 | 220 | 23 |
| 20 | 80 g natural rubber 80 g resin (of Ex. 9) 1 g sontal | 17.2 | 230 | >10000 | 705 | 44 |
| 21 | 80 g natural rubber 80 g resin (of Ex. 10) 1 g sontal | 17.3 | 200 | >10000 | 486 | 25 |
| 22 | 80 g natural rubber 80 g resin (of Ex. 13) 1 g sontal | 18.1 | 265 | >10000 | 469 | 27 |
| 23 | Comparison test 80 g natural rubber 80 g Zonarez B 115[4] 1 g sontal | 17.6 | 320 | >10000 | 360 | 22 |

[1]natural rubber "air dried"
[2]2.5 -di-tert. butyl hydroquinone (aging preventive)
[3]styrene-butadiene-block polymer by Shell Chemie
[4]poly beta-pinene resin, softening point 115° C.

What is claimed is:

1. A resin comprising a polymer of the monomer dimethyl-di-(cyclohexen-3)-yl-methane having a softening point in the range of about 70° to 150° C. and a number average molecular weight of about 800 to about 1200.

2. A resin according to claim 1 further comprising as a comonomer at least one mono- or di-ethylenically unsaturated hydrocarbon or chlorinated hydrocarbon, said hydrocarbon having from 4 to 12 carbon atoms, wherein the molar ratio of dimethyl-di-(cyclohexen-3)-yl-methane to said hydrocarbon is at least 1 to 2.

3. A resin according to claim 2 wherein said comonomer is taken from the class consisting of alpha-pinene, beta-pinene, iosprene, dipentene, vinyl cyclohexene, cyclododecene, styrene, methyl-derivatives of styrene selected from the group of α-methyl styrene, para-methyl styrene and ortho-methyl styrene, cyclopentadiene, dicyclopentadiene, butadiene and chloroprene.

4. A resin according to claim 2 wherein said comonomer is taken from the class consisting of alpha-pinene, beta-pinene, isoprene, dipentene, vinyl cyclohexene, cyclododecene, styrene, cyclopentadiene, butadiene and chloroprene.

5. A resin according to claim 2 wherein said ratio is at least 1 to 1.

6. A resin according to claim 5 wherein said ratio is from 1:0.1 to 1:1.

7. A resin according to claim 4 wherein said comonomer is alpha-pinene, beta-pinene, dipentene, cyclopentadiene, vinyl cyclohexene, cyclododecene, or styrene.

8. A resin according to claim 4 wherein said comonomer is butadiene, isoprene or chloroprene.

* * * * *